United States Patent [19]

Fagerburg et al.

[11] Patent Number: 5,783,307
[45] Date of Patent: Jul. 21, 1998

[54] UV STABILIZED MULTI-LAYER STRUCTURES WITH DETECTABLE UV PROTECTIVE LAYERS AND A METHOD OF DETECTION

[75] Inventors: David Richard Fagerburg; Jack Donald Vicars, both of Kingsport, Tenn.

[73] Assignee: Eastman Chemical Company, Kingsport, Tenn.

[21] Appl. No.: 743,351

[22] Filed: Nov. 4, 1996

[51] Int. Cl.⁶ .................. B32B 27/36; G01J 1/42; G01J 1/00; G01N 21/64; F21V 9/06; G02B 5/20
[52] U.S. Cl. .................. 428/412; 250/336.1; 250/372; 250/461.1; 359/350; 359/361
[58] Field of Search .................. 428/412; 250/336.1, 250/461.1, 372; 359/350, 361

[56] References Cited

U.S. PATENT DOCUMENTS

| | | | |
|---|---|---|---|
| 4,238,384 | 12/1980 | Blumberg et al. | 250/461.1 |
| 4,446,262 | 5/1984 | Okumura et al. | 524/89 |
| 4,861,630 | 8/1989 | Mihalich | 428/412 |
| 5,264,539 | 11/1993 | Shepherd | 528/272 |
| 5,270,116 | 12/1993 | Melancon et al. | 250/461.1 |
| 5,387,458 | 2/1995 | Pavelka et al. | 428/412 |
| 5,445,872 | 8/1995 | Suhadolnik et al. | 428/412 |
| 5,605,761 | 2/1997 | Barns et al. | 428/412 |

FOREIGN PATENT DOCUMENTS

| | | |
|---|---|---|
| 641426 | 12/1962 | Belgium . |
| 1397727 | 6/1964 | France . |

OTHER PUBLICATIONS

Helv. Chim Acta, 63, 413-19 (1980).

*Primary Examiner*—Veronica P. Hoke
*Attorney, Agent, or Firm*—Cheryl J. Tubach; Harry J. Gwinnell

[57] ABSTRACT

A UV stabilized multi-layer structure which has an easily visible UV protective layer comprises a UV protective layer and an underlying polymeric layer. The polymeric layer is either a polyester or a polycarbonate. The UV protective layer, which is exposed to UV radiation and protects the polymeric layer, comprises a UV absorbing compound, an optical brightener present in an amount sufficient to cause visual illumination of the UV protective layer upon exposure to a light source and a polymeric base material of either a polyester, polycarbonate or acrylic. Upon exposure to a UV light or white light source the UV protective layer is visibly illuminated. A method of detecting the UV protective layer in the UV stabilized multi-layer structure is also provided.

10 Claims, No Drawings

UV STABILIZED MULTI-LAYER STRUCTURES WITH DETECTABLE UV PROTECTIVE LAYERS AND A METHOD OF DETECTION

TECHNICAL FIELD

This invention relates to polyester or polycarbonate multi-layer structures that are exposed to ultraviolet radiation. More particularly, this invention relates to a method for detecting an ultraviolet protective layer in the structure.

BACKGROUND OF THE INVENTION

Polyesters and polycarbonates are not very stable to the effects of ultraviolet (UV) radiation. Exposure to UV radiation over extended periods of time causes hazing, property loss and yellowing. This lack of property stability upon exposure to UV radiation has long limited the uses of these materials in outdoor environments.

The addition of UV absorbing compounds, sometimes called UV stabilizers, are used to retard the loss of properties and particularly the development of yellow coloration in polyester or polycarbonate structures exposed to UV radiation. The UV absorbing compounds must have an extinction coefficient significantly higher than that of the polymers to be stabilized such that almost all of the incident UV radiation is absorbed by the compounds rather than the polymers. The energy absorbed by the UV absorbing compounds is harmlessly transferred to the polymers as heat rather than transferred electronically to the polymer chains. The fragmentation of the chains is thereby suppressed and the properties of the polymers are retained for a longer time of exposure. Thus, polyesters and polycarbonates that contain the UV absorbing compounds may be used in applications that have exposure to UV radiation.

The polyesters and polycarbonates structures containing UV absorbing compounds are typically used in sheet form. Sheeting made from clear, colored or pigmented polymers is advantageously employed in a great number of outdoor applications when the sheeting has sufficient color stability, mechanical property retention and thermoformability. The back side of the sheeting may also be printed on or have a decorated sheet adhered thereto. Representative applications include signs and marquees; vehicle luggage carriers; solar roof panels; skylights; highway sound barriers; greenhouse panels; aquarium walls; parts for motor and recreational vehicles such as windows, roofs, body panels, bug and air deflection screens and vents; transparent or translucent awnings; formed letters for application to buildings; airport runway marker signs; multiwall sheeting for use in signs; and facia for soft drink and juice dispensing machines.

For economic reasons, the UV stabilized polyester or polycarbonate structures are typically multi-layer having a UV protective layer, which is exposed to UV radiation, and an underlying polymeric layer, which is protected from the effects of UV radiation by the UV protective layer. The UV protective layer contains the UV absorbing compound and a polymeric base material of a polyester, polycarbonate or acrylic depending on the end use. The polymeric layer is typically a polyester or polycarbonate. The UV protective layer is typically either laminated or coextruded onto the polymeric layer. The UV protective layer performs its protective function as a relatively thin film as compared to the polymeric layer, thereby providing cost reduction by reducing the amount of UV absorbing compound needed.

The UV stabilized multi-layer structures may be sheets, films, profiles, or hollow profiles depending on the final use of the UV stabilized structures. The hollow profiles are typically made by connecting two or more sheets with ribbings running the length of the sheeting. The ribbings are spaced so as to provide structural stiffness to the final structures that would otherwise not be present. The ribbings make continuous channels down the length of the structure.

UV absorbing compounds are typically either fluorescing or non-fluorescing. Benzotriazoles, triazines and diphenylcyanoacrylates are useful as non-fluorescing UV stabilizers for polyesters and polycarbonates. Benzoxazinones are particularly useful as fluorescing compounds for various polymers, including polyesters, polyamides, polycarbonates, polyolefins and polysulfones. Additional UV absorbing fluorescing compounds are those that result from the substitution of various functional groups onto the aromatic ring(s) of the benzoxazinone system. The functional groups affect a shift in the wavelength of absorption of the compound or render it reactive with or copolymerizable into a polyester matrix. For example, an oligomer containing benzoxazinone units is blended with a polyester to give a copolymerized UV absorbing unit with permanence.

In the UV stabilized multi-layer structures, the UV protective layers are often extremely difficult to visualize accurately causing human error in labeling the sides of the structures to be exposed to UV radiation sources. This is especially so in a production environment when speed is required. The non-fluorescing UV absorbing compounds, even under illumination with UV light, do not fluoresce well if at all. The fluorescing UV absorbing compounds, while visible under illumination with a long wave UV light, are still difficult to detect. As the UV protective layer becomes thinner, it becomes more difficult to determine its presence and accurately measure its thickness. The boundary between the UV protective layer and the polymeric layer becomes more difficult to see as the total visual signal to the eye becomes less as the thickness diminishes. Additionally, the exciting wavelength of the UV absorbing compound is relatively short; thus, the UV protective layers do not show up when the multi-layer structures are illuminated with UV light from the sides opposite to the UV protective layers. Confusion of production personnel may occur since no fluorescing layers are seen, only an overall purple glow of the polymeric materials.

The difficulty of visualizing the UV protective layers creates problems not only during production, but also during installation of precut panels of the UV stabilized multi-layer structures. On such panels the sides to be exposed toward the sun are typically labeled on the masking film of the panels. During the process of constructing a greenhouse, for example, the protective masking of the panels may be removed and the panels not immediately installed. When the panels are later installed, the worker may no longer be certain which side should face the sun. The potential for costly error is obvious.

Thus, there exists a need in the art for a simple, inexpensive method to detect the presence of the UV protective layers to enable accurate labeling and installation of UV stabilized multi-layer structures. Accordingly, it is to the provision of such method that the present invention is primarily directed.

SUMMARY OF THE INVENTION

A UV stabilized multi-layer structure which has an easily visible UV protective layer comprises a UV protective layer and an underlying polymeric layer. The polymeric layer is either a polyester or a polycarbonate. The UV protective layer, which is exposed to UV radiation and protects the polymeric layer, comprises a UV absorbing compound, an optical brightener present in an amount sufficient to cause visual illumination of the UV protective layer upon exposure to a light source and a polymeric base material of either a polyester, polycarbonate or acrylic. Upon exposure to a UV light or white light source the UV protective layer is visibly illuminated. A method of detecting the UV protective layer in the UV stabilized multi-layer structure is also provided.

DESCRIPTION OF THE INVENTION

The production and installation difficulties associated with UV stabilized multi-layer structures have now been overcome by addition of a very low level of an optical brightener to the UV protective layer. The very low level of the optical brightener renders the UV protective layer easily visible without interfering with any essential functions of the UV absorbing compound.

The UV stabilized multi-layer structure of the present invention may be a sheet or film and comprises a UV protective layer and an underlying polymeric layer. The polymeric layer is either a polyester or a polycarbonate. The UV protective layer, which is exposed to UV radiation and protects the polymeric layer, consists essentially of a UV absorbing compound, an optical brightener and a polymeric base material of either a polyester, polycarbonate or acrylic. The UV absorbing compound may be either fluorescing or non-fluorescing.

The optical brightener, which is a fluorescing material, is used at low levels to render the UV protective layer visible by either illumination with a white light or UV light source. The level of optical brightener can be as low as a few to tens of parts per million or as high as parts per thousands. The only real restriction on the upper level of usefulness of the optical brightener is that too high a level of optical brightener may give an overly bluish cast which could be found to be objectionable in some applications. Additionally, a higher level only results in added cost without a corresponding additional benefit in rendering the UV protective layer more readily visible.

In the multi-layer structure utilizing the fluorescing UV absorbing compound, the desirable level of optical brightener is between 1 and 1000 ppm based on the total amount of polymeric base material in the UV protective layer and is, preferably, between 1 and 100 ppm. The visual signal from the addition of these low levels of the optical brightener, i.e. between 1 and 100 ppm, is considerably stronger than that from even the fluorescing UV absorbing compound. The activating wavelength for fluorescence is also longer such that a strong, white light source can be used for visualization. Of course the UV protective layer is also readily visual utilizing a long wave UV light source.

For use with the non-fluorescing UV absorbing compound, the desirable level of optical brightener is between 10 and 1000 ppm based on the total amount of polymeric base material in the UV protective layer and is, preferably, between 50 and 200 ppm. The visual signal from the addition of low levels of the optical brightener, i.e. between 10 and 200 ppm, is quite strong under long wave UV light illumination and enables easy visualization of the UV protective layer. At high enough levels of the optical brightener, i.e. above 200 ppm, visualization of the UV protective layer occurs upon exposure to a strong, white light source.

The lower level of the optical brightener for use with the non-fluorescing UV absorbing compounds is restricted by the amount of non-fluorescing UV absorbing compound present and the fact that benzotriazoles, triazines, diphenylcyanoacrylates and the like tend to quench UV light without fluorescing. Thus, the lower level must be at least high enough to allow some of the exciting radiation to reach the optical brightening compound to activate its fluorescence. As compared to the fluorescing UV absorbing compounds, the lower level in the presence of the non-fluorescing compounds is significantly higher.

The lower limit is also dependent on the type of non-fluorescing UV absorbing compound and must, therefore, be determined for each individual case. For example, with a benzotriazole compound the lower limit is 25 ppm, whereas with a diphenylcyanoacrylate compound the lower limit is about 10 ppm. In most cases a level of 50 ppm works satisfactorily for any of the non-fluorescing UV absorbing compounds.

A benefit provided by the activation of the optical brightener using the white light source is that the layer containing the optical brightener can be easily seen in sunlight conditions and under fluorescent light illumination. Thus, someone installing such a structure could see the UV protective layer under sunlight conditions and would not even need the use of a strong auxiliary light source such as a flashlight. Furthermore, even though the UV protective layer containing the optical brightener is very thin by comparison to the rest of the UV stabilized structure, the UV protective layer imparts an overall bluish cast to the entire sheet which is pleasing to the eye.

In addition, since the optical brightener is activated by longer wavelengths of light, the optical brightener is able to be seen not only under strong white light illumination but also when the light source is placed opposite to the UV protective layer. In that case even, the UV protective layer can still be clearly seen. Thus, confusion of production, installation or other personnel no longer exists.

A very wide range of optical brighteners may be employed in this invention. Many such compounds are disclosed in the prior art. One general class of such compounds are referred to in BE 641,426 and FR 1,397,727. These compounds are characterized by a general structure as shown below:

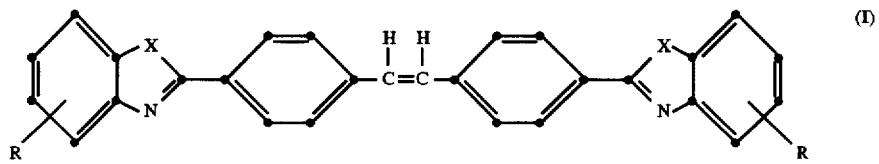

(I)

where R is an alkyl or aryl group of any desired length, generally less than 25 carbons, and X can be either S, O or NH. In general, the better optical brighteners are made with X equal to O and with R equal to H, a lower alkyl group of from 1 to 6 carbons or an aryl group such as benzene. Although the structures as shown are interpreted to be the cis-stilbene geometry, this is not a requirement. In the actual synthesis of the compound the double bond referred to can be cis-, trans- or a mixture of the two geometric isomers. More elaborate optical brighteners of this general system are enumerated in Helv. Chim Acta, 63, 413–19 (1980). For example, the benzoxazole ring may be changed via substitution of a benzene ring carbon for a nitrogen. Thus, a great number of useful optical brighteners exist for use in this invention.

A preferred optical brightener for use in this invention belongs to the class of compounds referred to as benzoxazoles, i.e., where X is O in Structure I above. A more preferable compound is the parent compound itself where X=O and R=H.

Another class of optical brighteners useful in the present invention is represented by the following structure:

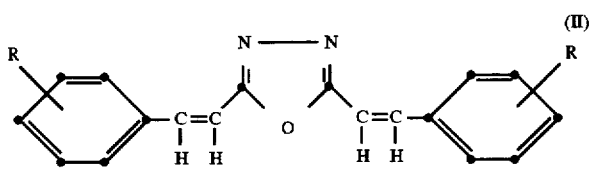

where R can be any desired group chosen from alkyl, aryl, halo, nitro, hydroxy, carboxy or alkyl or aryl ester of a carboxyl group. In general, the most useful group for this class of optical brighteners is where R is $CO_2R'$ wherein R' is a lower alkyl group of from 1 to 8 carbons. In addition, the preferred position of substitution is para for the R group. A more preferred optical brightener is where R is $CO_2Me$ and in the para position.

Many other classes of compounds useful as optical brighteners are also well known in the prior art, but are not specifically referred to herein. They are equally useful but are not readily commercially available.

A strong UV absorbing compound that is compatible with the polymer of the UV protective layer, i.e. polyesters, polycarbonates, or acrylics, is needed to insure that the polyester or polycarbonate in the underlying polymeric layer is protected against color shift when exposed in an outdoor environment. The UV absorbing compound can be chosen from a large number of compounds well known in the art. The UV absorbing compound in the UV protective layer is typically present in concentrations of between 0.25 and 10 weight percent based on the total weight of the UV absorbing compound and polymeric base material.

Fluorescing UV absorbing compounds useful to prevent yellowing of polyesters and polycarbonates come from the classes of compounds containing the benzoxazinone ring system such as is disclosed in U.S. Pat No. 4,446,262 or U.S. Pat. No. 5,264,539. The benzoxazinone absorbers are characterized by a structure where $X_1$ and $X_2$ may be chosen from, but not limited to, the following functional groups: alkyl, aryl, heteroaryl, halo, alkoxy, aryloxy, hydroxy, carboxy, ester and nitro. $X_1$ and $X_2$ may also be hydrogen. Thus, more than one functional group may be present on the benzoxazinone ring system itself. Where multiple functional groups are present they may be the same group or different groups.

Additional benzoxazinone structures that are considered useful for stabilization of polyesters and polycarbonates against the harmful effects of outdoor weathering are give in U.S. Pat. No. 4,446,262 and U.S. Pat. No. 5,264,539.

Non-fluorescing UV absorbing compounds for use in the polyester, polycarbonate or acrylic based UV protective layer come from the classes of benzotriazoles, triazines or diphenylcyanoacrylates or derivatives thereof. Representative compounds of the class of benzotriazole compounds are characterized by the structure:

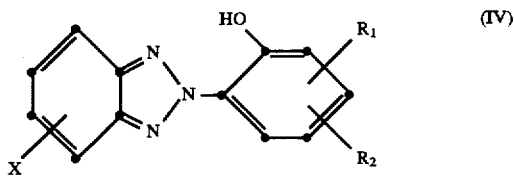

where X is an alkyl or aryl substituent or a halogen atom such as chlorine and $R_1$ and $R_2$ are alkyl or aryl groups of from 1 to 20 carbon atoms or either one may be hydrogen. These groups may be located in any desired substitution pattern on the ring but are usually ortho- and/or para- to the hydroxyl group.

Benzotriazoles are also known to be prepared as essentially dimers of the compounds in Structure (IV) in order to reduce their volatility in the sheet manufacturing process. Such compounds are represented by the following structure:

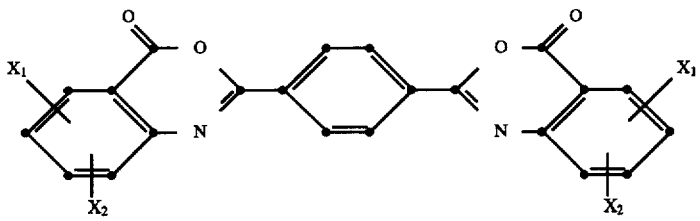

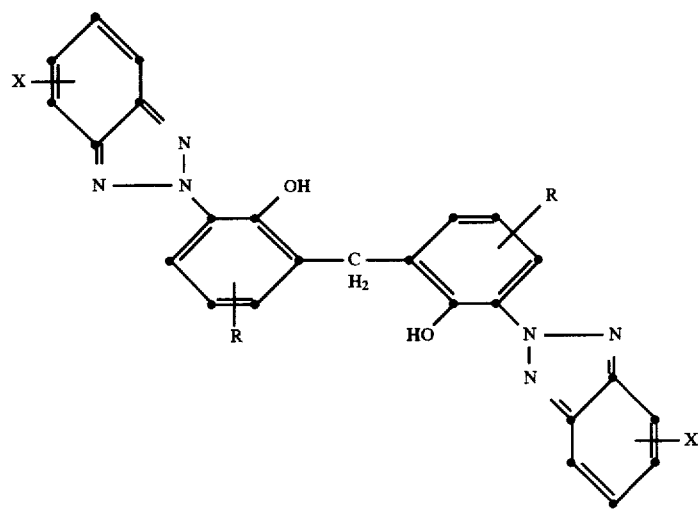

where X and R have the same definition as for X and $R_1/R_2$, respectively, in Structure IV, except that R may not be hydrogen. The R group may be located at will on the ring but is usually located para- to the hydroxyl grouping for greatest synthetic ease.

A representative structure from the class of triazine compounds useful as non-fluorescing UV absorbing compounds is as follows:

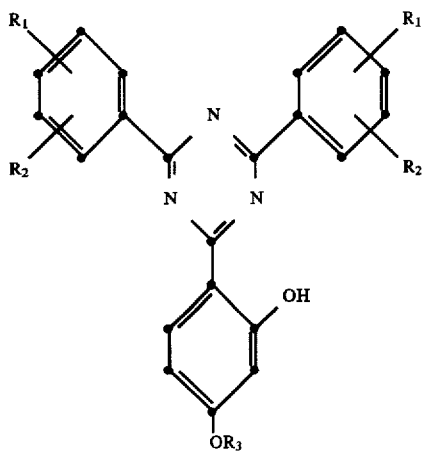

where $R_1$, $R_2$ and $R_3$ are an alkyl or aryl group. Their position of substitution on the rings may be as desired but is generally ortho- and para- to the bond to the triazine ring for best synthetic ease. One or both of the two groups $R_1$ or $R_2$ may be hydrogen.

A representative structure for the diphenylcyanoacrylate class of compounds is as follows:

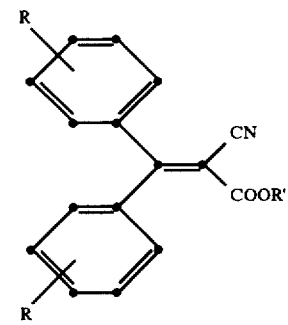

where R is an alkyl or aryl groups of from 1 to 20 carbons. Also R may contain a functional group such as carbomethoxy, hydroxy or an acid group or an ester group wherein the alcohol in the ester portion may be from 1 to 20 carbons. R' is an alkyl group of from 1 to 20 carbons. The alkyl groups referred to for both R and R' may be either linear or branched.

Polyesters suitable for use in both the UV protective layer and the polymeric layer may be any polyester, modified polyester or copolyester. Particularly, suitable for the present invention is polyethylene terephthalate (PET) or any of its copolymers. Copolymers suitable for use may be prepared from PET modified with 1,4-cyclohexanedimethanol wherein the 1,4-cyclohexanedimethanol (CHDM) component of the copolymer is present in from 1 to 99 mol percent. Other modifiers for PET include isophthalic acid and naphthalenedicarboxylic acid. Coglycols may also be employed to prepare the copolyesters. Limited examples of such coglycols include neopentyl glycol, 1,4-butanediol, diethylene glycol, 1,4-cyclohexanedimethanol and 2,2,4,4-tetramethyl-1,3-cyclobutanediol. This list of modifying acids and glycols to produce copolyesters is a representative listing and, obviously, is not meant to be exhaustive.

Polycarbonates useful in either the UV protective layer or polymeric layer are generally chosen from bisphenol A polycarbonates or derivatives and/or copolymers thereof. Examples of the derivatives include 3,3',5,5'-tetramethyl bisphenol A polycarbonate and 3,3',5,5'-tetrabromo bisphenol A polycarbonate. The bisphenol A may be substituted with any aryl or alkyl groups which do not interfere with the production of the final polycarbonate and are generally tetra-substituted with the substituents being ortho to the phenolic —OH groups. Preferred polycarbonates are the parent bisphenol A polycarbonate and its copolymers with other bisphenols such as those described above.

Acrylics for use in the UV protective layer are chosen from homopolymers and/or copolymers of derivatives of methacrylic acid such as methyl methacrylate. Alkyl esters of methacrylic acid are the most commonly employed materials and are often copolymerized with other alkyl esters of methacrylic acid or acrylic acid such as ethyl acrylate, propyl acrylate, butyl acrylate, ethyl methacrylate, propyl methacrylate and butyl methacrylate. In addition, many such homo- or copolyacrylates are modified by the addition of a diene rubber or other rubbery compound that will result in higher impact properties of the acrylic material.

The UV protective layer which contains the UV absorbing compound and optical brightener need not be of the same composition as the polymeric layer which does not contain the UV absorbing compound and optical brightener. Thus, for example, a UV protective layer based on a copolymer of PET containing 31 mol % of moieties derived from CHDM could be mixed with the UV absorbing compound 2,2'-(1,4-phenylene)bis-4H-3,1-benzoxazin-4-one and the optical brightener 4,4'- bis(benzoxazoyl)stilbene (sold commercially under the trade name of Eastobrite OB-1 brightener from Eastman Chemical Company), which is then coextruded onto a much thicker layer of PET containing 12 mol % moieties derived from CHDM. The UV protective layer need not have more CHDM present in its polymeric base material than the CHDM content of the copolyester used for polymeric layer. The polymeric base material need not contain any CHDM or even be a polyester or copolyester, but may be chosen from any of the copolymers generally referred to above.

The polymers used in the UV protective layer and the polymeric layer may also be different polymers. Suitable combinations are set forth below:

TABLE I

| UV Protective Layer<br>Polymeric Base Material | Polymeric Layer |
| --- | --- |
| Polyester/copolyester | Polycarbonate/<br>copolycarbonate |
| Polycarbonate/<br>copolycarbonate | Polyester/copolyester |
| Acrylic | Polyester/copolyester |
| Acrylic | Polycarbonate/<br>copolycarbonate |

The thickness of the UV protective layer on the underlying polymeric layer may vary according to the desired technological ends of said coating. The UV protective layer thickness will be governed by the concentration of UV absorbing compound. Together the thickness and concentration must create a UV protective layer that will absorb at least 90% of the harmful UV radiation prior to it reaching the underlying polymeric layer. More preferably the UV protective layer should absorb 99% of the harmful UV radiation and even more preferably 99.9% thereof. As a general rule, using the UV absorbing compound levels commonly used in the art, the UV protective layer need only be 1 to 2 mil in thickness in order to screen 99% of the incoming UV light contained in solar radiation. Obviously this minimum thickness may be further reduced by a higher concentration of the UV absorbing compound in the protective layer. This minimum UV protective layer thickness must be present in the final part. Thus, if a sheet is thermoformed to make the final desired part, the UV protective layer thickness must be the minimum even where the layer has been thinned out by the drawing down in the thermoforming process.

The UV stabilized multi-layer structure may be a film, a solid sheet, a profile or a hollow profile. In the hollow profile, as discussed in the background of the invention, the UV protective layer is placed on either one side or both flat sides just the same as if it were a solid sheet.

The UV protective layer may be applied to the polymeric layer by coextrusion, lamination or coating technology. For example, the polymeric base material, UV absorbing compound and the optical brightener may be extruded into a film of approximately 2 mils thickness. This film is subsequently laminated to a thicker sheet of polyester or polycarbonate. The final laminated structure will have all of the desirable properties of good color retention and layer visualization as that in a coextruded structure. Solvent coating or casting technology are also suitable means of application of the UV protective layer to the polymeric layer.

EXAMPLES

In the examples UVCON and xenon arc Weather-Ometer were artificial exposure devices used to simulate outdoor weathering. The following test procedure was employed for UVCON. Sample plaques were cut to 3 by 4.5 in. (7.6 by 11.4 cm) and exposed in pairs. Exposure was conducted according to ASTM G53-93 in an Atlas Devices UVCON equipped with 313 nm B bulbs (FS-40 lamps). The device was set to 70° C. black panel temperature, condensing temperature of 40° C. and an 8 hr light/4 hr dark cycle. Samples were exposed in 96 hr increments, color measurement at each increment being followed by return to the device for further exposure.

For xenon arc Weather-Ometer, the following test procedure was employed. Sample plaques were cut to 2.5 by 5.5 in. (6.4 by 14.0 cm). The xenon arc Weatherometer, Atlas Devices Ci65, was set to the following operating conditions: 0.35 W/m$^2$ flux at 340 nm, borosilicate inner and outer lamp filters, 63° C. black panel temperature, 55% RH, 102 min. light only/18 min. light and water spray. The water spray was deionized water using a set of three F80 spray nozzles spraying on only the front side of the samples. The samples were exposed for 800, 1600, 2400, 3200, and 4000 kJ (measured at 340 nm).

Color measurement was accomplished using a HunterLab Ultrascan spectrophotometer in transmission mode following the current CIE recommendations to obtain L*, a* and b* values. These conditions included a D65 light source, specular included mode and a 10 degree angle observer.

Example 1

This example illustrates the use of the optical brightener with a fluorescing absorbing compound in the UV protective layer in accordance with the invention. A coextrusion line was configured with a 3.5 in. (89 mm) main extruder and a 1.5 in. (38 mm) satellite extruder for application of a coextruded UV protective layer. The satellite extruder was connected by means of an adapter line to a Dow feedblock for 2 layer coextrusion. Both extruders, the adapter lines, the feedblock section and the sheeting die were set at 232° C. (450° F.). The sheeting die was placed in as close proximity as possible to the gap between rolls one and two of a vertical roll stack of three rolls (numbered from the top down). The extrudate was conducted downward in an s-wrap configuration. The main extruder was fed with polyethylene terephthalate copolyester containing 31 mol percent 1,4-cyclohexanedimethanol at a nominal IV of 0.75 dL/g (measured at 0.25 wt % in 60:40 weight:weight phenol:tetrachloroethane). The satellite extruder was fed with a mixture of the same copolyester blended with a concentrate of 2,2'-(1,4-phenylene)bis-4H-3,1-benzoxazin-4-one made up in the same copolyester. The amount of concentrate was sufficient to give 3.2 wt % of the benzoxazinone in the final extruded UV protective layer. In addition, a concentrate of an optical brightener, 4,4'-bis (benzoxazoyl)stilbene (Eastobrite® OB-1 available from Eastman Chemical Company of Kingsport, Tenn.), in PET was added to give an overall concentration of 10 ppm of the optical brightener in the UV protective layer. The total sheeting thickness was held at 118 mils (3 mm) of which 4 to 5 mils (100 to 125 microns) was the UV protective layer.

Visualization of the UV protective layer by means of side illumination using a UV light was easily accomplished. Lighting of the side opposite from the UV protective layer likewise resulted in being able to see the UV protective layer as opposite to the direction of illumination by the UV light source. When the coextruded UV protective layer was reduced to 2 mils, it was still easily seen. Additionally, the UV protective layer could be seen in sunlight outdoors or in an office space lighted with fluorescent lights without any other illumination source irrespective of the direction of the illumination. The sheeting had an overall bluish cast when viewed from the edge.

Example 2

This example illustrates the differences between the prior art UV stabilized multi-layer structures and those of the present invention. The same extrusion setup and materials as in Example 1 were used to make 118 mil (3 mm) sheet except that the optical brightener concentrate was absent. The UV protective layer was visible when illuminated from the same side, but effectively disappeared when illuminated from the back side of the sample, contrary to the behavior of the sheeting in Example 1. In addition, when the UV protective layer thickness was reduced to 2 mils (50 microns), an accurate measurement of the UV protective layer with a hand held microscope was difficult to obtain, also contrary to Example 1. Further, the UV protective layer could not be seen in sunlight conditions outdoors or in an office space lighted with fluorescent lights.

Example 3

This example illustrates that addition of the optical brightener (OB) does not adversely affect the weathering properties of the UV stabilized multi-layer structure. Plaques cut from the sheeting of Examples 1 and 2, along with a control containing no UV absorbing compound and no optical brightener, were placed in UVCON device and exposed as detailed above. The coloration of the plaques was measured by the b* value since the L* and a* values did not change appreciably. Table 2 below shows the b* values with exposure time.

TABLE 2

| | b* Values | | |
|---|---|---|---|
| Exposure, Hours | Example 1 sheeting (OB present) | Example 2 sheeting (no OB) | Unstabilized sheeting |
| 0 | 0.46 | 0.52 | 0.01 |
| 96 | 1.80 | 1.98 | 5.46 |
| 192 | 2.13 | 2.17 | 6.76 |
| 288 | 2.34 | 2.18 | 7.33 |
| 384 | 2.16 | 2.12 | 7.93 |

The retardation of color development was essentially the same for the plaque containing the optical brightener and UV absorbing compound (Example 1) vs the plaque that contained UV absorbing compound alone (Example 2). Therefore, the presence of the optical brightener does not adversely affect weathering performance while simultaneously conferring the advantages of ease of layer visualization.

Example 4

This example illustrates that the optical brightener alone is not sufficient to control color development and must be used in conjunction with a strong UV absorbing compound. A film of polyethylene terephthalate copolyester containing 31 mol percent 1,4-cyclohexanedimethanol at a nominal IV of 0.75 dL/g was extruded with enough concentrate of 4,4'-bis(benz-oxazoyl)stilbene to give a final level of optical brightener in the copolyester film of 50 ppm along with a control film. The film was exposed in a xenon arc Weather-Ometer and gave the following results as set forth in Table 3.

TABLE 3

| | b* Values | | |
|---|---|---|---|
| Exposure, Kilojoules | Sheeting Without OB Present | | Sheeting With OB Present | |
| 0 | 4.50 | (0) | 4.00 | (0) |
| 800 | 5.13 | (0.63) | 4.22 | (0.22) |
| 1600 | 6.32 | (1.82) | 5..11 | (1.11) |
| 2400 | 7.27 | (2.77) | 6.52 | (2.45) |
| 3200 | 8.02 | (3.52) | 7.40 | (3.40) |

The numbers in parenthesis are the change from the initial value and are shown for greater ease of comparison. Although the films had a pleasing initial bluish edge color, it is readily apparent from the data that the rate of yellowing is essentially identical either with or without the optical brightener present. Neither of these films contained a UV absorbing compound.

Example 5

This example illustrates the use of the optical brightener with the non-fluorescing UV absorbing compound in accordance with this invention. A 1.5 in. screw diameter extruder and film die were set at 232° C. (450° F.). The film die was placed in as close proximity as possible to the top roll of a vertical roll stack of two rolls. The extrudate was conducted downward in an s-wrap configuration. The extruder was fed with polyethylene terephthalate copolyester containing 31 mol percent 1,4-cyclohexanedimethanol at a nominal IV of 0.75 dL/g blended with a concentrate of bis[2-hydroxy-5-t-octyl-3-(benzotriazol-2-yl)phenyl]methane prepared in the same copolyester. The amount of concentrate was sufficient to give 3 wt % of the benzotriazole compound in the final film. In addition, a concentrate of 4,4'-bis(benzoxazoyl) stilbene in the copolyester was added to give an overall concentration of optical brightener of 100 ppm in the UV protective layer. The film thickness was held at 5 mils (125 microns). This film was subsequently extrusion laminated to a 118 mil (3 mm) sheet of the same copolyester.

Visualization of the protected layer by means of side illumination using a UV light was easily accomplished. Lighting of the side opposite from the protected layer likewise resulted in being able to see the layer as opposite to the direction of illumination by the UV light source.

Example 6

This example illustrates the difference between the prior art UV stabilized multi-layer structures and those of the present invention. The same sample preparation as in Example 5 was used to make 118 mil (3 mm) sheet with a 5 mil extrusion laminated film added except that the optical brightener concentrate was absent. The protected layer containing the UV absorbing compound was not visible when illuminated with a long wave UV light contrary to the behavior of the sheeting in Example 5.

Example 7

This example illustrates that addition of the optical brightener (OB) does not adversely affect the weathering properties of the resultant product. Plaques cut from the sheeting of Examples 5 and 6, along with a control containing no UV absorbing compound and no optical brightener, were placed in UVCON device and exposed as detailed in Example 5. The coloration of the sample was measured by the b* value. Table 4 shows b* values with exposure time.

TABLE 4

| | b* Values | | | | | |
|---|---|---|---|---|---|---|
| Exposure, Hours | Example 5 Sheeting (OB Present) | | Example 6 Sheeting (No OB) | | Unstabilized Sheeting | |
| 0 | 3.20 | (0) | 3.75 | (0) | 0.01 | (0) |
| 96 | 4.64 | (1.44) | 5.11 | (1.36) | 5.46 | (5.45) |
| 192 | 5.94 | (2.74) | 5.51 | (1.76) | 6.76 | (6.75) |
| 288 | 4.64 | (1.44) | 5.22 | (1.47) | 7.33 | (7.32) |
| 384 | 4.83 | (1.63) | 5.35 | (1.60) | 7.93 | (7.92) |

The numbers in parenthesis are the change from the initial value and are shown for greater ease of comparison. The retardation of color development, which was significant over the control sample, was essentially the same for the sample containing the optical brightener and UV absorbing compound as compared to the sample that contained UV absorbing compound alone. Therefore, the presence of the optical brightener did not adversely affect weathering performance while simultaneously conferring the advantages of ease of layer visualization.

Example 8

This example illustrates that too low a level of optical brightener for the benzotriazole UV absorbing compound used in Example 5 does give the benefits of the invention. The extrusion of the film of Example 5 was repeated using a final level of the optical brightener of 10 ppm. The protected layer in the laminate was not readily visible.

Example 9

This example illustrates that too low a level of optical brightener for the benzotriazole UV absorbing compound used in Example 5 when used instead with a diphenylcyanoacrylate absorbing compound gives the benefits of the invention. The extrusion of film of Example 5 was repeated using a final level of the optical brightener of 10 ppm and 2-ethylhexyl-2-cyano-3,3-diphenylpropenoate as the UV absorbing compound at a concentration of 3 wt %. The protected layer in the laminate was readily visible under long wave UV illumination.

Example 10

This example illustrates that addition of the optical brightener does not adversely affect the weathering properties of the resultant product for a diphenylcyanoacrylate UV absorbing compound system. Sheeting was prepared as in Example 5 using 2-ethylhexyl 2-cyano-3,3-diphenylpropenoate as the absorbing compound instead of the benzotriazole compound. The UV absorbing compound was present at 3 wt % as in Example 5. The laminate was prepared in the same way as well. Plaques cut from this sheeting along with a control containing UV absorbing compound and no optical brightener (OB) were placed in a UVCON device and exposed as detailed above. The coloration of the sample is measured by the b* value. Table 5 below shows the b* values with exposure time.

TABLE 5

| | b* Values | | | |
|---|---|---|---|---|
| Exposure, Hours | OB Present | | No OB | |
| 0 | 0.78 | (0) | 0.45 | (0) |
| 96 | 2.20 | (1.42) | 1.68 | (1.23) |
| 192 | 2.47 | (1.69) | 2.24 | (1.79) |
| 288 | 2.66 | (1.88) | 2.35 | (1.90) |

The numbers in parenthesis are the change from the initial value and are shown for greater ease of comparison. The retardation of color development was the same for the sample containing the optical brightener and UV absorbing compound as compared to the sample that contained UV absorbing compound alone. Therefore, the presence of the optical brightener did not adversely affect weathering performance while simultaneously conferring the advantages of ease of layer visualization.

Example 11

This example illustrates the use of an optical brightener in accordance with the invention. A 1.5 in. screw diameter extruder and film die were set at 280° C. The film die was placed in as close proximity as possible to the top roll of a vertical roll stack of two rolls. The extrudate was conducted downward in an s-wrap configuration. The extruder was fed with polyethylene terephthalate copolyester at a nominal IV of 0.72 dL/g blended with a concentrate of 2,2'-(1,4-phenylene)bis-4H-3,1-benzoxazin-4-one prepared in the same copolyester. The amount of concentrate was sufficient to give 3 wt % of the benzooxazinone compound in the final film. In addition, a concentrate of 4,4'-bis(benzoxazoyl) stilbene in the copolyester was added to give an overall concentration of 100 ppm of the optical brightener in the UV protective layer. The film thickness was held at 5 mils (125 microns). This film was subsequently extrusion laminated to a 60 mil (1.5 mm) sheet of the same copolyester.

Visualization of the UV protective layer by means of side illumination using a UV light was easily accomplished. Lighting of the side opposite from the UV protective layer likewise resulted in being able to see the layer as opposite to the direction of illumination by the UV light source. The UV protective layer was also visible under normal fluorescent lighting conditions, as well as in sunlight outdoors, as a bluish layer on the laminate. Omission of the optical brightener during the extrusion of the 5 mil film resulted in a laminate wherein the UV protective layer when visualized with a UV light source was not as easily seen and was not visible under fluorescent lighting or outdoor sunlight.

Example 12

This example illustrates the use of an optical brightener with polycarbonates in accordance with the invention. A 1.5 in. screw diameter extruder and film die were set at 280° C. The film die was placed in as close proximity as possible to the top roll of a vertical roll stack of two rolls. The extrudate was conducted downward in an s-wrap configuration. The extruder was fed with bisphenol A polycarbonate (Makrolon 2608 available from Bayer Corporation of Germany) blended with a concentrate of bis[2-hydroxy-5-t-octyl-3-(benzotriazol-2-yl)phenyl]methane prepared in the same polycarbonate. The amount of concentrate was sufficient to give 6 wt % of the bis[2-hydroxy-5-t-octyl-3-(benzotriazol-2-yl)phenyl]methane in the final film. In addition, a concentrate of 4,4'-bis-(benzoxazoyl)-stilbene in polycarbonate was added to give an overall concentration of 100 ppm in the UV protective layer. The film thickness was held at 5 mils (125 microns). This film was subsequently extrusion laminated to a 118 mil (3 mm) sheet of the same polycarbonate.

Visualization of the UV protective layer by means of side illumination using a UV light was easily accomplished. Omission of the optical brightener during the extrusion resulted in a laminate that gave no indication of fluorescence in the UV protective layer. The UV protective layer was essentially indistinguishable from the rest of the laminate.

Example 13

This example illustrates using an optical brightener with acrylics in accordance with the invention. A film was prepared from a copolymer of methyl methacrylate and ethyl acrylate containing 5 wt % of bis[2-hydroxy-5-t-octyl-3-(benzotriazol-2-yl)phenyl]-methane as the UV absorbing compound. In addition, 4,4'-bis(benzoxazoyl)stilbene was added to give an overall concentration of 100 ppm in the acrylic UV protective layer. The UV protective layer was subsequently extrusion laminated to a 118 mil (3 mm) sheet of bisphenol A polycarbonate.

Visualization of the UV protective layer by means of side illumination using a UV light was easily accomplished owing to the bright blue-white color. Omission of the optical brightener during the extrusion resulted in a laminate that gave no indication of fluorescence in the UV protective layer. The UV protective layer was essentially indistinguishable from the rest of the laminate.

The ease of visualization of the UV protective layer in the present invention due to the addition of low levels of optical brightener results in being able to more readily measure the layer under production conditions and thereby be able to make production related adjustments to the thickness or thickness distribution of the layer. A convenient method for installers to detect the UV protective layer of the UV stabilized structures is also provided by the present invention such that the direction of installation, i.e. having the UV protective layer face the direction of the radiation exposure of a panel, is easily determined.

The invention has been described in detail with particular reference to preferred embodiments thereof, but it will be understood that variations and modifications can be effected within the spirit and scope of the invention.

We claim:

1. An ultraviolet stabilized multi-layer structure comprising:

a) an ultraviolet protective layer comprising an ultraviolet absorbing compound; a polymeric base material selected from the group consisting of a polyester, an acrylic and a polycarbonate; and an optical brightener present in an amount sufficient to cause visual illumination of the ultraviolet protective layer upon exposure to a white light source; and b) a polymeric layer comprising a polyester or a polycarbonate;

wherein said ultraviolet absorbing compound is a fluorescing material with said optical brightener being present in an amount between 1 and 1000 ppm or said ultraviolet absorbing compound is a non-fluorescing material with said optical brightener being present in an amount between 200 and 1000 ppm, the amount of optical brightener being based on the total weight of said polymeric base material in said ultraviolet protective layer.

2. The structure as recited in claim 1 wherein the fluorescing material is a benzoxazinones.

3. The structure as recited in claim 1 wherein the non-fluorescing material is selected from the group consisting of benzotriazoles, triazines and diphenylcyanoacrylates.

4. The structure as recited in claim 1 wherein the optical brightener has the general chemical structure:

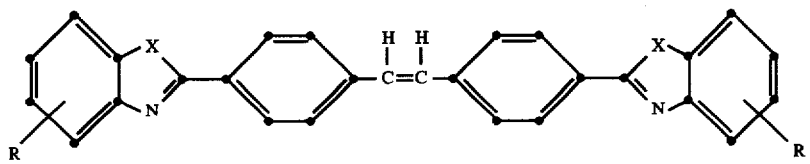

where R is hydrogen, an alkyl group or an aryl group and X is S, O or NH.

5. The structure as recited in claim 4 wherein for the optical brightener X is O and R is hydrogen, a lower alkyl group of from 1 to 6 carbons or an aryl group.

6. A method of detecting an ultraviolet protective layer in an ultraviolet stabilized multi-layer structure comprising the steps of:

(a) preparing an ultraviolet stabilized multi-layer structure having
(1) an ultraviolet protective layer comprising an ultraviolet absorbing compound; a polymeric base material selected from the group consisting of a polyester, an acrylic and a polycarbonate; and an optical brightener present in an amount sufficient to cause visual illumination of the ultraviolet protective layer upon exposure to a white light source; and (2) a polymeric layer comprising a polyester or a polycarbonate;

(b) applying a white light source to the ultraviolet stabilized multi-layer structure; and (c) visibly determining the location of the ultraviolet protective layer by its illumination;

wherein the ultraviolet absorbing compound is a fluorescing material with the optical brightener being present in an amount between 1 and 1000 ppm or the ultraviolet absorbing compound is a non-fluorescing material with the optical brightener being present in an amount between 200 and 1000 ppm, the amount of optical brightener being based on the total weight of the polymeric base material in the ultraviolet protective layer.

7. The method as recited in claim 6 wherein the fluorescing material is a benzoxazinones.

8. The method as recited in claim 6 wherein the non-fluorescing material is selected from the group consisting of benzotriazoles, triazines and diphenylcyanoacrylates.

9. The method as recited in claim 6 wherein the optical brightener has the general chemical structure:

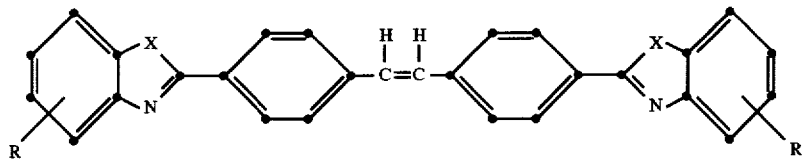

where R is hydrogen, an alkyl group or an aryl group and X is S, O or NH.

10. The method as recited in claim 9 wherein for the optical brightener X is O and R is hydrogen, a lower alkyl group of from 1 to 6 carbons or an aryl group.

* * * * *